United States Patent
Reissig et al.

(10) Patent No.: US 9,871,263 B2
(45) Date of Patent: Jan. 16, 2018

(54) HYDROCARBON-OPERABLE FUEL CELL SYSTEM

(71) Applicant: AVL LIST GMBH, Graz (AT)

(72) Inventors: Michael Reissig, Graz (AT); Juergen Rechberger, Graz (AT); Arthur Kliment, Steyr (AT)

(73) Assignee: AVL LIST GMBH, Graz (AT)

( * ) Notice: Subject to any disclaimer, the term of this patent is extended or adjusted under 35 U.S.C. 154(b) by 98 days.

(21) Appl. No.: 14/765,605

(22) PCT Filed: Feb. 4, 2014

(86) PCT No.: PCT/EP2014/000290
§ 371 (c)(1),
(2) Date: Aug. 4, 2015

(87) PCT Pub. No.: WO2014/117952
PCT Pub. Date: Aug. 7, 2014

(65) Prior Publication Data
US 2016/0006064 A1    Jan. 7, 2016

(30) Foreign Application Priority Data

Feb. 4, 2013   (AT) .................................... A 82/2013

(51) Int. Cl.
*H01M 8/06* (2016.01)
*H01M 8/0612* (2016.01)
*C01B 3/32* (2006.01)

(52) U.S. Cl.
CPC ............. *H01M 8/0631* (2013.01); *C01B 3/32* (2013.01); *C01B 2203/0205* (2013.01);
(Continued)

(58) Field of Classification Search
CPC ............. C01B 3/32; C01B 2203/0205; H01M 2250/20; H01M 8/0631; Y02T 90/32
See application file for complete search history.

(56) References Cited

U.S. PATENT DOCUMENTS

2002/0114988 A1   8/2002 Iwasaki et al.
2003/0234455 A1   12/2003 Mieney et al.
(Continued)

FOREIGN PATENT DOCUMENTS

AT        502131       1/2007
DE      4446841 A1    7/1996
(Continued)

OTHER PUBLICATIONS

U.S. Appl. No. 14/765,616, filed Aug. 4, 2015, Rechberger.
(Continued)

*Primary Examiner* — Stewart Fraser
*Assistant Examiner* — Monique Wills
(74) *Attorney, Agent, or Firm* — Sheridan Ross P.C.

(57) ABSTRACT

The invention relates to an energy generation apparatus (1), in particular for use in a vehicle, which can be operated using hydrocarbons such as diesel and the like, which comprises a fuel cell (2) and is provided with connections (3, 4, 5) for introduction of air and the hydrocarbons and for the output of electric energy. According to the invention, the energy generation apparatus has three essentially physically separate functional units (7, 8, 9), where the first functional unit (7) is configured as a supply device for media and has essentially devices for introduction of fuel and air, a second functional unit (8) is configured for reforming and has essentially devices for converting the hydrocarbons into process gas and a third functional unit (9) is configured for generation of electric energy and has essentially the fuel cell (2), where the process gas produced in the second functional unit (8) is fed to the third functional unit (9).

14 Claims, 5 Drawing Sheets

(52) U.S. Cl.
 CPC ... *C01B 2203/066* (2013.01); *H01M 2250/20* (2013.01); *Y02T 90/32* (2013.01)

(56) References Cited

U.S. PATENT DOCUMENTS

| | | | |
|---|---|---|---|
| 2005/0188616 A1* | 9/2005 | Bizjak | C01B 3/505 48/127.9 |
| 2005/0214614 A1* | 9/2005 | Han | H01M 8/04097 429/415 |
| 2008/0107937 A1 | 5/2008 | Ravenda et al. | |
| 2009/0258262 A1 | 10/2009 | Kaupert | |
| 2011/0269032 A1 | 11/2011 | Fischer et al. | |
| 2011/0269037 A1 | 11/2011 | Burmeister et al. | |
| 2013/0029237 A1* | 1/2013 | Fujisawa | H01M 8/2475 429/423 |

FOREIGN PATENT DOCUMENTS

| | | |
|---|---|---|
| DE | 10243275 | 4/2004 |
| DE | 102007039594 A1 | 4/2008 |
| DE | 102007018311 | 10/2008 |
| DE | 102011107669 | 1/2013 |
| EP | 1414092 A | 4/2004 |
| EP | 2256850 A1 | 12/2010 |
| WO | WO 99/44252 A1 | 9/1999 |
| WO | WO 2007/136080 A1 | 11/2007 |

OTHER PUBLICATIONS

International Search Report for International (PCT) Patent Application No. PCT/EP2014/000285, dated Apr. 30, 2014 with English translation, 5 pages.
Written Opinion for International (PCT) Patent Application No. PCT/EP2014/000285, dated Apr. 30, 2014 with English translation, 12 pages.
International Preliminary Report on Patentability for International (PCT) Patent Application No. PCT/EP2014/000285, dated Aug. 4, 2015 with English translation, 14 pages.
Written Opinion for International (PCT) Patent Application No. PCT/EP2014/000290, dated Apr. 30, 2014 with English translation, 12 pages.
International Preliminary Report on Patentability for International (PCT) Patent Application No. PCT/EP2014/000290, dated Aug. 4, 2015 with English translation, 14 pages.
Official Action for Austrian Patent Application No. A82/2013, dated Jan. 13, 2014, 4 pages.
International Search Report prepared by the European Patent Office dated Apr. 23, 2014, for International Application No. PCT/EP2014/000290.
Office Action prepared by the Austrian Patent Office dated Jan. 13, 2014, for Austria Patent Application No. A82/2013.

\* cited by examiner

HYDROCARBON-OPERABLE FUEL CELL SYSTEM

CROSS REFERENCE TO RELATED APPLICATIONS

This application is a national stage application under 35 U.S.C. 371 and claims the benefit of PCT Application No. PCT/EP2014/000290 having an international filing date of Feb. 4, 2014, which designated the United States, which PCT application claims the benefit of Austria Application No. A 82/2013 filed Feb. 4, 2013, the disclosures of each are incorporated by reference herein.

The invention relates to an energy generating assembly, particularly for use in a vehicle, able to be operated by hydrocarbons such as diesel and the like which comprises a fuel cell and connections for the introducing of air and the hydrocarbons and for the discharging of electrical energy.

Such an energy generating assembly can for example be used in a motor vehicle as a compact and efficient energy source, particularly for supplying electric and/or thermal energy.

Particularly trucks which travel great distances—for example in the USA—in which the driver sleeps in the cab of the truck, require electrical energy during downtimes, e.g. during truck stops or while the truck driver is sleeping. The energy serves in supplying the truck with HVAC services (such as e.g. heating) and multimedia technology (such as e.g. radio, television and the associated receivers) as well as lighting.

The energy required for the above has to date been generated by so-called "idling." Meaning that during the truck's downtimes, its engine runs either continuously or for certain intervals at engine idling speed in order for the alternator to generate the necessary energy. Small combustion engines for powering a generator are also known from the prior art and are additionally arranged on board of such trucks to independently generate energy during the truck's downtimes.

The efficiency of such systems in relation to the electrical energy produced is low since a high loss of energy naturally occurs in the internal combustion engines during the diesel combustion process due to the heat generated in the combustion process and due to the friction from the mechanical movement of the shaft.

The low efficiency not only wastes energy but also produces high quantities of environmentally harmful emissions. Furthermore, running internal combustion engines in stationary vehicles or vehicles powered by external power sources presents a considerable source of noise. Lastly, "idling" also comes at high cost since an unnecessarily high amount of fuel is wasted and the number of the truck's operating hours is unnecessarily driven up.

Energy generating assemblies which generate energy by means of a fuel cell are known from the prior art. The efficiency of fuel cells is substantially more favorable than that of internal combustion engines because the chemical reaction energy of continuously supplied fuel and an oxiding agent is directly converted into electrical energy without any energy loss as occurs when coupling a combustion engine/ generator and/or taking the indirect mechanical motion route.

However, fuel cells need pure-form hydrogen, methanol, formic acid, methane or the like as fuel. Conventional types of fuel cells cannot directly process the long-chain hydrocarbons such as diesel or gasoline as are directly available in a truck.

So that vehicles do not have to carry separate fuel, reformers are known from the prior art which first reform hydrocarbons into process gases able to be processed by fuel cells and only thereafter is same processed by a fuel cell. However, these systems require a great deal of energy to reform the hydrocarbons which in turn reduces the system's efficiency.

In order to increase the efficiency of such an energy generating system, DE 10 2007 039 594 A1 thus discloses a reformer and further elements needed for the reformation process as well as a compact design to the fuel cell stack arranged in a common external insulation. This printed publication further proposes recirculating anode exhaust gas in the reformer so as to fully utilize the thermal energy of the exhaust gas and use the chemical substances contained therein for the reformation. A number of precursor materials need to be supplied and processed in order to supply such a system and for the reforming process, thereby requiring a plurality of auxiliary components.

The task of the present invention is that of providing a fuel cell system which is compact, universally applicable and which can be sold as a ready-to-install autonomous unit.

This task is solved by an energy generating assembly in accordance with claim 1. Advantageous embodiments of the invention are claimed in the dependent claims.

In the terms of the invention, a vehicle is any type of ground vehicle, particularly passenger cars, commercial trucks, recreational vehicles, mobile homes, tanks, etc.; aircraft, particularly airplanes; watercraft, particularly ships and submarines, etc., or spacecraft.

A fuel cell in the sense of the invention is a galvanic cell which converts the chemical reaction energy of a continuously supplied fuel and an oxiding agent into electrical energy. In order to obtain a higher voltage, multiple cells are usually connected in series into a stack.

In the terms of the invention, devices are elements serving to implement a sub-process within the overall energy generating process performed by the energy generating assembly.

In the terms of the invention, functional units are functional sections of the energy generating assembly which respectively perform a plurality of sub-processes of the overall energy generating process.

In the terms of the invention, media supply is the supplying of the substances or mixtures of substances required for the overall energy generating process.

In the terms of the invention, reformation is any type of reforming to generate a synthesis gas at least containing hydrogen, particularly steam reforming, partial oxidation (CPOX) and/or autothermic reformation. According to the invention, a reformer is correspondingly an apparatus for reforming.

Arranged in the sense of the invention means that at least two elements are kept at a defined position relative to each other.

Successively in the sense of the invention means arranged one after the other, whereby two respectively successively arranged elements are directly connected and/or have a direct area of contact.

In the terms of the invention, a longitudinal axis is that axis of a body corresponding to the direction of its greatest extension.

In the terms of the invention, a process temperature is the temperature reached in normal operation of a device when realizing a respective sub-process.

In the terms of the invention, damping means are any means which are suited to attenuating a vibration and/or momentum.

In the terms of the invention, a frame plate is any type of two-dimensional structure suited to absorbing forces.

In the terms of the invention, a fixing plate is any type of two-dimensional structure suited to holding or anchoring devices.

In the terms of the invention, a flexible fixing tab is any type of means suited to securing and which cushions vibrations/momenta and/or equalizes thermal expansion or contraction.

In the terms of the invention, insulation is any type of thermal insulation for reducing the flow of thermal energy.

Autothermic in the sense of the invention means that both exothermic as well as endothermic reactions run parallel during the overall process of the energy generating assembly so that the overall process is substantially independent of any external heat supply. Adiabatic in the sense of the invention means that both exothermic as well as endothermic reactions run parallel during the overall process of the energy generating assembly so that the overall process is substantially independent of any external heat supply and a large part of the energy contained in the introduced hydrocarbons, in particular greater than 25%, preferentially greater than 30%, even more preferentially greater than 35% and most preferentially greater than 40%, is converted into electrical energy.

In the terms of the invention, a housing is any type of shell which protects the contents from contaminants and/or external forces.

Dividing the power generating assembly into three functional units yields a particularly simple structure to the power generating assembly and makes the respective elements easily accessible for repair purposes in the event of a malfunction since devices which require similar operating temperatures are respectively centralized in one functional unit. Should a malfunction occur in one functional unit, removing the insulation of the functional unit can essentially enable access to all the devices of said functional unit.

In one advantageous embodiment, the three functional units are arranged substantially successively, particularly in relation to the direction of the intake air flow through the three functional units, and/or substantially along a common longitudinal axis.

The arrangement of the three functional units one behind the other has the advantage that the respective products and media processed by the devices of the functional units can be immediately conveyed to the next process step in another functional unit without having to travel longer line sections which would be accompanied by a loss of energy, e.g. due to thermal radiation.

When the three functional units are arranged along a common longitudinal axis in the supporting structure, a particularly compact arrangement results in terms of the space needed for the energy generating assembly. The "symmetrical" arrangement of the starter burner, afterburner and reformer along the longitudinal axis also promotes the uniform combustion of the respective process gases in the afterburner.

In a further advantageous embodiment, the process temperature of the energy generating assembly's devices substantially increases from the first functional unit to the second functional unit over the third functional unit.

With respect to the aspirated intake air, this arrangement has the advantage that the air is first compressed in its direction of flow in the first functional unit, then heated by the high process temperature in the fuel cell, and ultimately has the highest possible temperature for reforming upon reaching the second functional unit so as to facilitate the combustion in the afterburner, or for the reformation respectively. The same applies to the fuel transported in the first functional unit, vaporized and processed into a hot process gas for the reformation in the second functional unit, and reacted at high temperatures with the air, respectively oxygen, into reformate in the third functional unit of the fuel cell. Since devices having a similar process temperature can be grouped into one functional unit, the insulation of the respective functional unit can be dimensioned accordingly. Further advantageously, the devices can be respectively arranged in that functional unit which poses no detrimental thermal effects for the respective apparatus.

In a further advantageous embodiment, all the devices of the energy generating assembly are substantially arranged on a common supporting structure.

This arrangement allows the realizing of a particularly compact design to the energy generating assembly. The supporting structure constitutes a common framework for the plurality of the energy generating assembly elements and thus serves to both stabilize the devices as well as accommodate external forces acting on the energy generating assembly from the vehicle or from other external influences. The supporting structure further allows the energy generating assembly to be mounted to a vehicle.

In a further advantageous embodiment, the supporting structure comprises fixing means, particularly for mounting to a vehicle.

Fixing means on the supporting structure enables the energy generating assembly to be particularly readily mounted at a respective site of application. The supporting structure thereby keeps the energy generating assembly in a defined position, making it unnecessary to anchor the individual devices of the energy generating assembly at the site of application.

In a further advantageous embodiment, the supporting structure comprises damping means which, particularly when used in a motor vehicle, are arranged between the supporting structure and said vehicle.

The damping means ensure that vibrations, for example during use in a vehicle, only have an attenuated impact on the energy generating assembly. A direct transmission of vibrations could for example adversely affect the reformer function due to a discontinuous supply of media.

In a further advantageous embodiment, a first fixing plate is arranged on the far side of the first functional unit from the second functional unit, a second fixing plate arranged between the first and the second functional unit, particularly for fixing devices of the first and/or second functional unit, and/or an additional third fixing plate arranged between the second and the third functional unit. It is further advantageous for the third fixing plate to be designed as an adapter plate consisting of an upper and lower plate (14b) and connecting the devices of the second functional unit to the fuel cell thermally and/or in fluid-communicating manner.

Configuring the third fixing plate as an adapter plate, or distributor plate respectively, which effects the dispersion of the process gas, the air and the respective fuel exhaust, eliminates a complicated and space-consuming dispersion of the gases through tubing. Designing the adapter plate with an upper and lower plate enables the dispersal channels in the adapter or distributor plate to be cleaned upon removal of the lower plate. A reformer catalyst can moreover be replaced when needed after the lower plate has been removed.

In a further advantageous embodiment, the first fixing plate, the second fixing plate and/or the third fixing plate are connected to the supporting structure by at least one flexible fixing tab. The flexible fixing tab enables equalizing thermal deformations of the individual devices. The fixing tab can moreover have a damping function.

In a further advantageous embodiment, the energy generating assembly comprises insulation by means of which the energy generating assembly is substantially adiabatic and which in particular has three insulation regions corresponding to the functional units.

The insulation enables most of the heat released during the overall process to be retained in the energy generating assembly such that the overall process is substantially adiabatic.

In a further advantageous embodiment, the energy generating assembly comprises a housing, in particular consisting of housing sections, each of which substantially covers one of the three functional units and which are individually removable.

The housing prevents contaminants from entering into the energy generating assembly and thereby protects it from external forces. Preferably, each functional unit is covered by one housing section, each respectively being individually removable. Doing so allows repairs to be made in one functional region or to devices of a functional region without the other housing sections needing to be dismantled.

In a further advantageous embodiment, at least one device for supplying media such as a blower or a compressor, a valve and/or a hydrocarbon pump is arranged external of the housing and/or the insulation.

Some of the media-supplying devices are sensitive to high temperatures. The reason for this is that some devices comprise for example ball bearings or may also have controls which are not so readily made temperature-resistant. An arrangement external of the insulation can thus exclude individual functional unit devices from the temperature prevailing within the functional unit.

In a further advantageous embodiment, the housing forms at least part of the supporting structure.

Having the housing form the supporting structure eliminates the need for a frame. It is also possible under certain circumstances to have a combined frame/housing as a supporting structure, wherein the housing then forms at least part of the supporting structure.

Further advantages, features and possible applications of the present invention will follow from the description below in conjunction with the figures.

Figure 1:
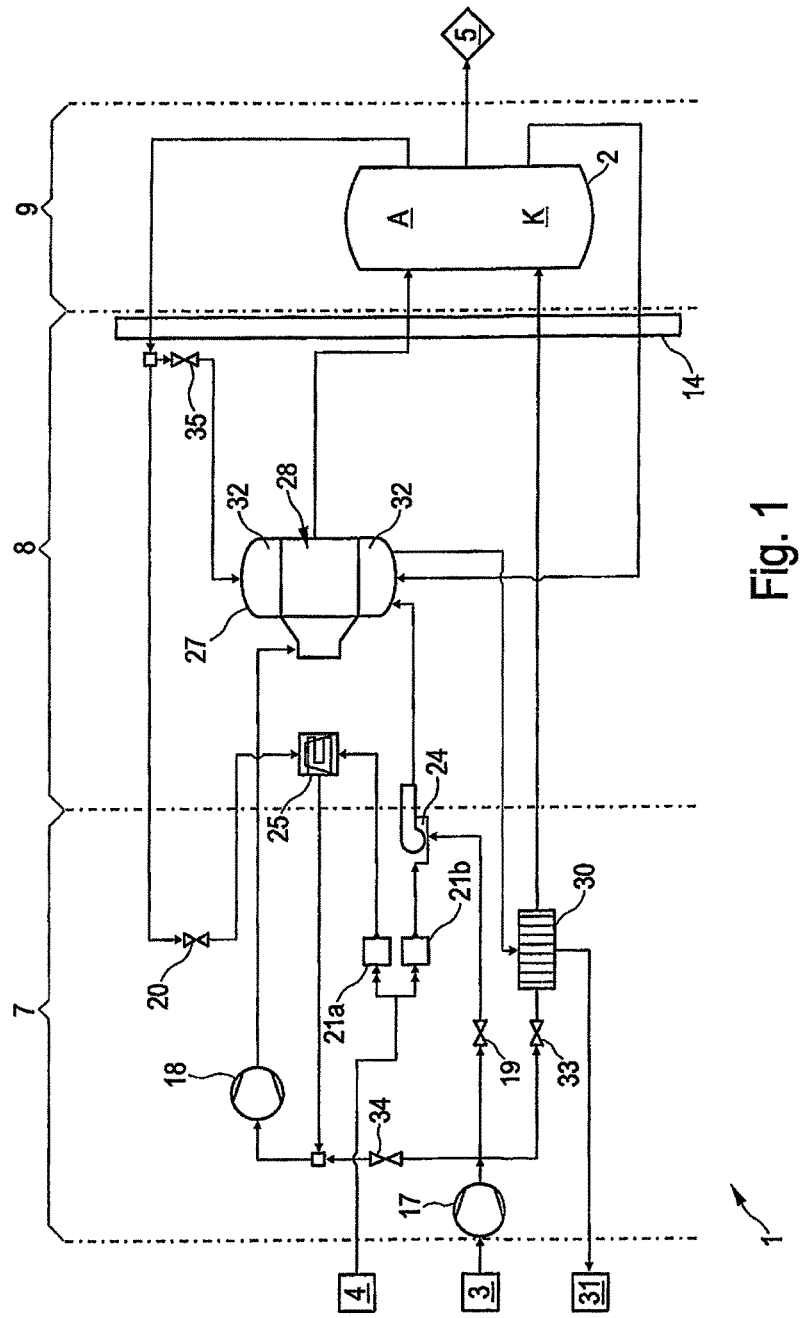
FIG. 1 depicts a partly schematic process diagram of an embodiment of the inventive energy generating assembly.

Reference will be made to the process diagram of FIG. 1 in describing the operational principle of the energy generating assembly according to the invention as follows:

Hydrocarbons, preferentially diesel, is pumped into the energy generating assembly through hydrocarbon connection 4, preferably via hydrocarbon pumps 21a and 21b. In the start phase, the pumping preferably ensues via hydrocarbon pump 21b, whereby the starter burner 24 is supplied with hydrocarbon. Furthermore, the air blower 17 preferably supplies the energy generating assembly 1 with air, which is preferentially filtered, via air connection 3.

A preferably provided valve 19 for supplying air to the starter burner 24 is thereby opened during the start phase, whereas a preferably provided valve 34 for supplying air to the reformer 28 is closed during the start phase. The air and the hydrocarbons are preferably heated and ignited in the starter burner 24. The starter burner 24 thereby heats the combustion chamber 32 of the afterburner 27 preferably arranged around the reformer 28 as well as the reformer 28.

The exhaust gas of the starter burner 24, which flows out of the combustion chamber 32 of the afterburner 27, is preferably routed through a heat exchanger 30 to the exhaust gas connection 31, which is preferentially an exhaust pipe. The preferably provided cathode air valve 33, which is preferentially a butterfly valve, is hereupon opened provided it is not already open so that air can flow to cathode K of the fuel cell 2 and be heated in the heat exchanger 30.

The preferably provided reformer air valve 34 is now also opened and air conveyed into the reformer 28 by the recirculation fan 18 where it is heated by the exhaust gas of the starter burner 24 and then routed to the anode A of the fuel cell 2 via the preferably provided third fixing plate, adapter plate 14 respectively.

Anode exhaust gas furthermore flows into the vaporizer 25 over the preferably provided and now open recirculation valve 20. At this point in time, the hydrocarbon pump 21a also pumps hydrocarbons to the vaporizer, which vaporize due to the heated anode exhaust gas in the vaporizer 25. This gas mixture is preferably mixed with air in the recirculation fan 18 into educt gas, the reformer process gas, and introduced into the reformer 28 via tubing through the combustion chamber 32. The reformer is now preferably heated by the starter burner 24 to the extent that the reformer process gas reforms into hydrogen and byproducts.

This reformate is in turn routed over the third fixing plate, or adapter plate 14 respectively, to the anode of the fuel cell 2 where the conversion from substantially hydrogen and oxygen to water and electrical energy then occurs. The electrical energy is preferably discharged to a load via electrical connection 5. Thermal energy is released by the conversion process.

All the gas temperatures equalize to a uniform level as they flow along the third fixing plate, adapter plate 14 respectively.

The heated cathode exhaust air is routed into combustion chamber 32 of the afterburner 27. A part of the heated anode exhaust air is preferably supplied back to the vaporizer 25. Another part of the anode exhaust air is routed into the combustion chamber 32 of the afterburner 27 via the preferentially provided, now open burner anode exhaust air valve 35.

The anode exhaust air is mixed with the cathode exhaust air in the combustion chamber 32 of the annular afterburner 27, with an exothermic reaction preferentially occurring by means of a catalyst. The thermal energy thereby released serves on the one hand to heat or respectively insulate the reformer 28 and, on the other, improves the heat distribution in the reformer 28. The starter burner 24 can preferably now be switched off. Heat losses and the energy to activate the autothermic reaction in the reformer 28, or a preferably provided reformer catalyst respectively, is equalized by the heat of the exothermic reaction in the fuel cell 2 and the exothermic reaction in the afterburner 27 such that the overall system is substantially adiabatic.

A bypass line (not shown) from the starter burner 24 directly into the heat exchanger 30 can optionally be preferably provided. More thermal power can thereby be supplied independent of the required electrical output. This is particularly advantageous in those applications in which the fuel cell 2 is exposed to extremely cold temperatures and/or the vehicle requires a lot of heat for heating or cooling the interior. The devices of the energy generating assembly 1 shown in the FIG. 1 process diagram can essentially be divided into three functional units:

A first functional unit 7 for supplying media thereby preferably comprises the air blower 17, the recirculation fan 18, the starter burner air valve 19, the preferably provided recirculation valve 20, the hydrocarbon pumps 21*a* and 21*b*, the heat exchanger 30, the cathode air valve 33 and/or the reformer air valve 34.

Preferably, at least part of the starter burner 24 is also arranged in the first functional unit 7 and/or is a component common to the first and second functional units 7, 8.

As is clear from the process diagram, the first functional unit 7 essentially supplies the energy generating assembly 1 with the air and hydrocarbon media, the precursor materials for the overall energy generating process. Same are preferably processed in the first functional unit 7 and then provided to the devices of the second functional unit 8 and/or the third functional unit 9.

A second functional unit 8 preferably comprises the afterburner 27 with combustion chamber 32, the reformer 28, the vaporizer 25, an exhaust gas chamber 26 (not shown in FIG. 1) and/or the afterburner anode exhaust gas valve 35.

Thus, the devices for converting the hydrocarbons into process gas for the fuel cell 2 are substantially concentrated in the second functional unit 8.

Preferably, at least part of the starter burner 24 is also arranged in the second functional unit 8 and/or is a component common to the first and second functional units 7, 8.

The reformate is introduced from the reformer 28 into a third functional unit 9 comprising the fuel cell 2 as the essential device. Preferably, a plurality of fuel cells 2 can also be provided in the functional unit 9, for example in a stack, or even further preferably a plurality of stacks.

The devices of the functional units 7, 8 and 9 are thereby preferably arranged in the respective functional units 7, 8 and 9 in such a manner that the process temperature substantially increases from the first functional unit 7 to the second functional unit 8 over the third functional unit 9.

In the first functional unit 7, environmental temperatures of up to 450° C. thereby preferably prevail, preferentially environmental temperatures of up to 300° C., particularly preferentially environmental temperatures of up to 200° C., even more preferentially environmental temperatures of up to 100° C. and most preferentially environmental temperatures of up to 60° C.; in the second functional unit 8, environmental temperatures of preferably 200° C. to 1000° C. essentially prevail, preferentially 300° C. to 800° C., particularly preferentially 400° C. to 700° C., even more preferentially 450° C. to 650° C. and most preferentially 550° C.; and/or in the third functional unit 9, temperatures of 550° C. to 850° C. thereby preferably prevail, preferentially 600° C. to 800° C., particularly preferentially 650° C. to 750° C. and most preferentially 700° C. These temperatures are in particular reached when the operating state of the energy generating assembly 1 is established.

As depicted in the process diagram, the three functional units 7, 8, 9 are preferably substantially separated spatially. They are also preferably arranged successively, as the FIG. 1 process diagram shows. The three functional units 7, 8 and 9 are thereby in particular arranged successively in relation to the direction the air conducted through the system by the air blower 17 flows. This has the advantage of the air being gradually heated on its way through the three functional units 7, 8, 9 to the fuel cell 2 so as to bring the fuel cell to the operating temperature or to maintain it at same.

Figure 2:
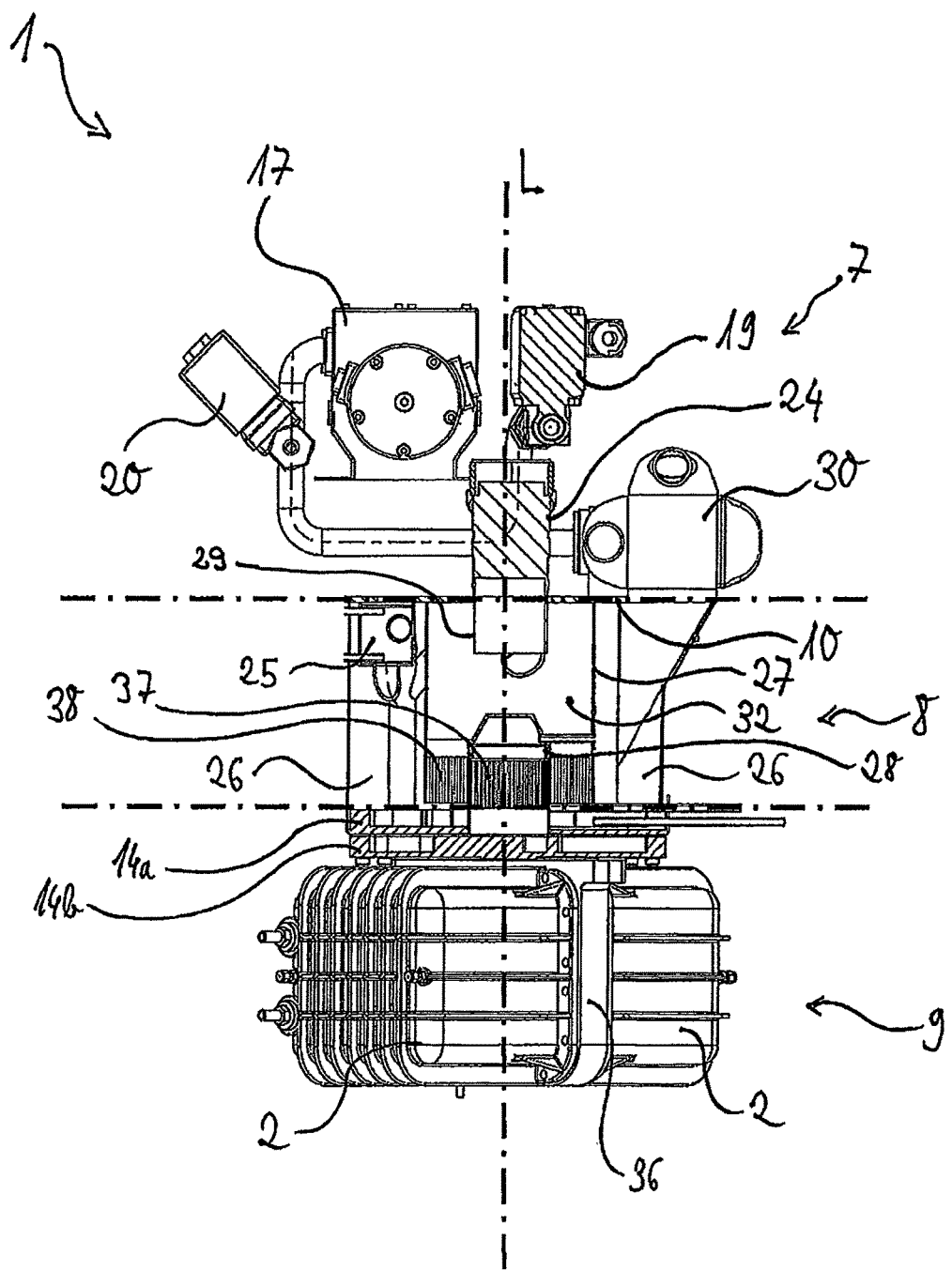
FIG. 2 shows a partly schematic cross-sectional view of an embodiment of the inventive energy generating assembly.

FIG. 2 shows the structure of one embodiment of the inventive energy generating assembly through a plane comprising longitudinal axis L. As was already indicated in FIG. 1, the energy generating assembly 1 is divided into three functional units 7, 8, 9. The first functional unit 7 thereby primarily comprises devices serving to supply the media and/or to stop or to respectively regulate the supply of media to the individual devices of the energy generating assembly 1. Examples of same are hereby blowers, various valves and hydrocarbon pumps. Devices for processing the media for the energy generating assembly 1 are further preferentially arranged in the first functional unit 7.

A heat exchanger 30 is thus preferably provided which heats the intake air prior to it being fed to the cathode K of the fuel cell 2. Compression and mixing of different media can preferably also occur in the first functional unit 7.

It is furthermore preferable for the starter burner 24 to be at least partly arranged in the first functional unit 7, as depicted in the embodiment according to FIG. 2. The starter burner 24 serves in particular to supply heat to the energy generating assembly 1 in the start phase. The elements for producing the flame are hereby preferably arranged in the first functional unit 7, e.g. glow plugs and hydrocarbon vaporizers, the starter burner tube 29 then preferably extending into the combustion chamber 32 of the afterburner 27, which is a part of the second functional unit 8. It is however also possible for the starter burner 24 to be wholly arranged in the second functional unit 8. As it is likewise possible for the heat exchanger 30 to be wholly arranged in the second functional unit 8.

The second functional unit 8 essentially comprises the devices for reforming, respectively converting, the hydrocarbons into reformate, process gas respectively, for the fuel cell 2. In accordance with the embodiment depicted in FIG. 2, the reformer is thereby preferably arranged in the combustion chamber 32 of the afterburner 27. The afterburner 27 is in turn preferably arranged in an exhaust gas chamber 26 in which the exhaust gas of the afterburner 27 and/or the exhaust gas of the starter burner 24 is routed to the heat exchanger 30. The vaporizer 25 is furthermore preferably arranged in the exhaust gas chamber 26, same vaporizing hydrocarbons in the recirculated anode exhaust gas from the fuel cell 2 before same is introduced into the reformer 28. The starter burner 24 and/or the afterburner 27 hereby serve to heat the reformer 28. The exhaust gas chamber 26 in turn heats the outer wall of the afterburner 27, or additionally insulates the afterburner vis-à-vis insulation 16 respectively, and concurrently provides thermal energy for vaporizing the hydrocarbons in the vaporizer 25. The reformate or process gas respectively for anode A and the air for cathode K of the fuel cell 2 is ultimately routed to the respective connections in the third functional unit 9 via the third fixing plate 14, adapter plate respectively, which preferably consists of an upper plate 14*a* and a lower plate 14*b*. The cathode exhaust air and the anode exhaust gas from the fuel cell 2 are also preferably connected to the respective connections of the second functional unit 8 by the third fixing plate 14, adapter plate respectively. Preferably, the reformer 28 comprises a reformer catalyst 37 and the afterburner 27 an afterburner catalyst 38.

Compared to the first functional unit 7, the second functional unit 8 comprises devices requiring a higher operating temperature to perform their respective function than those of the first functional unit 7. Thus, the temperature in the second functional unit 8 as a whole is preferentially kept at a higher level than the temperature in the first functional unit 7. Preferably, the entire volume of the second functional unit 8 is filled by an exhaust gas chamber 26 surrounding the afterburner 27.

The third functional unit 9 comprises two fuel cell stacks 2 in the embodiment as depicted. The fixing of these two fuel cell stacks 2 and/or the dispersal of the process gas and the other media and/or discharge of the cathode exhaust air and the anode exhaust gas hereby preferably ensues via a distributor plate 36 attached to the fixing/adapter plate 14.

Preferably, however, a fuel cell 2 with one stack or a fuel cell with more than two stacks can also be used. The fuel cell 2 is preferentially a SOFC fuel cell, although other types of fuel cells can also be used such as e.g. an alkaline fuel cell, a polymer electrolyte fuel cell, a direct methanol fuel cell, a formic acid fuel cell, a phosphoric acid fuel cell, a molten carbonate fuel cell, a direct carbon fuel cell and/or a magnesium air fuel cell or a combination thereof.

The energy generating assembly 1 is preferentially surrounded by insulation 16 which is not, however, depicted in FIG. 2.

Figure 3:
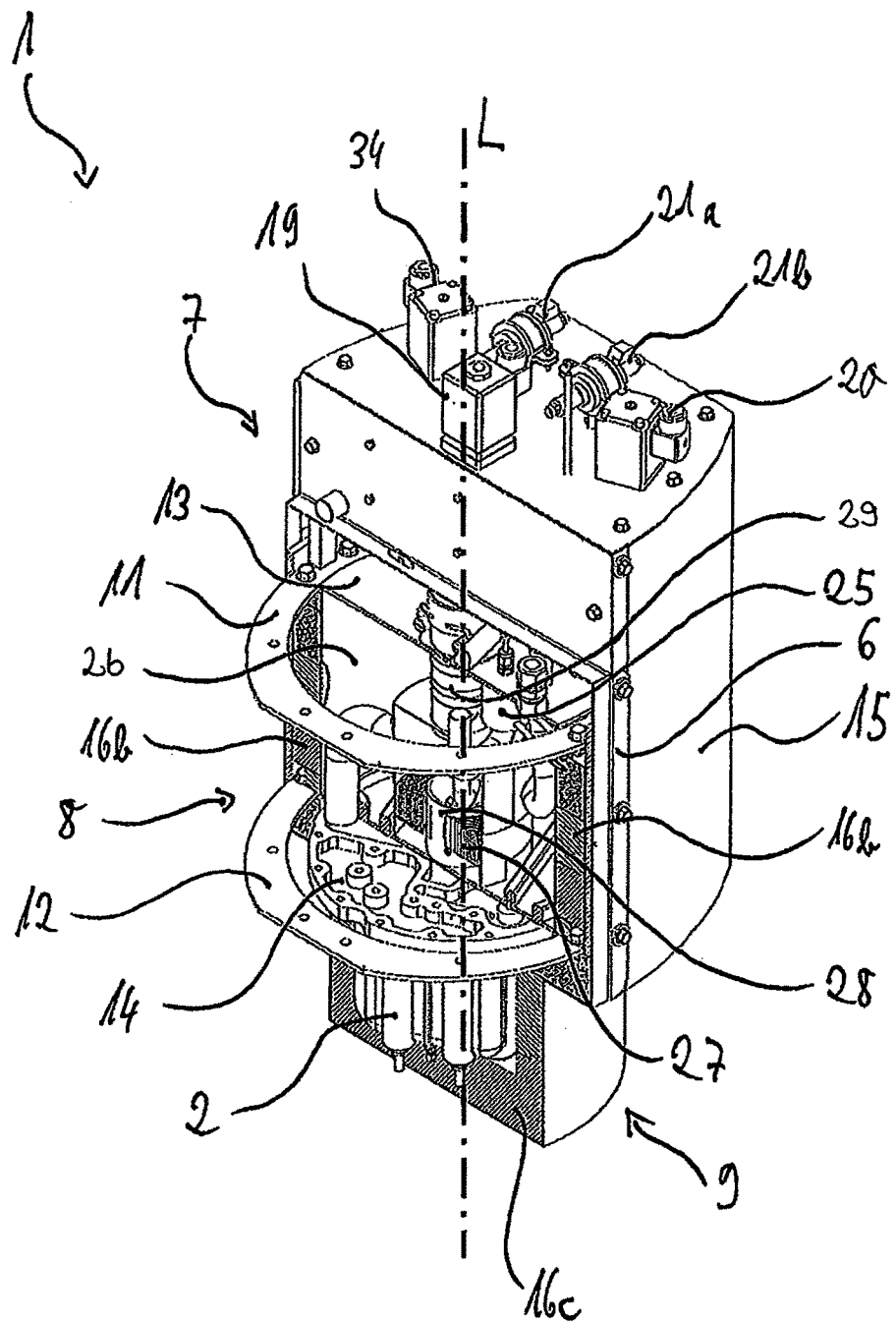
FIG. 3 shows a partly schematic perspective plan view of an embodiment of the inventive energy generating assembly with the housing partly removed and the insulation partly removed and/or cross-sectionally depicted.

FIG. 3 shows a partly schematic perspective representation of a further embodiment of the inventive energy generating assembly 1. This embodiment substantially differs from that of FIG. 1 in that the fuel cell 2 only has one stack. The individual configurations of this and the preceding embodiment can be readily combined without any difficulty.

It is evident from FIG. 3 that the functional units are preferably substantially separated by the planes defining the second frame plate 11 for the partition between the first functional unit 7 and the second functional unit 8 and the third frame plate 12 for the partition between the second functional unit 8 and the third functional unit 9.

As further follows from FIG. 3, the energy generating assembly 1 is preferably enclosed in insulation 16. The insulation prevents the outflow of the thermal energy released during various energy generating assembly 1 subprocesses into the environment. The insulation 16 preferably comprises insulation plates adapted e.g. by milling to the form of the respective functional unit 7, 8, 9. The insulation 16 can further preferably be realized with a foam, with the space between the housing and the devices of the energy generating assembly 1 hereby being filled with foam. The use of said foam to insulate the inventive energy generating assembly is expressly provided.

The insulation 16 is thereby preferably divided into three regions 16a, 16b, 16c, each insulating one respective functional region 7, 8, 9. By so doing, the insulation regions 16a, 16b, 16c are individually removable in order to access a device of a respective functional unit 7, 8, 9 without thereby needing to dismantle the other functional units 7, 8, 9.

Preferably, the energy generating assembly 1 is at least partly surrounded by a housing 15. This housing 15 in turn also preferably consists of housing sections 15a, 15b, 15c individually covering a respective functional unit 7, 8, 9. The housing 15 preferably consists of a plurality of shells or layers which are in particular made from a metal and/or plastic. The housing thus protects the energy generating assembly 1 from contaminants and/or from external mechanical effects.

Devices which should not or do not need to be insulated from the environment or for which thermal energy exchange with the environment is in fact even desirable are preferably arranged external of the housing 15 or the insulation 16 respectively. In the embodiment of the invention shown in FIG. 3, these are for example the hydrocarbon pumps 21a, 21b, valves 19, 20, 34 and the butterfly valve/valve 33 (not shown).

The energy generating assembly 1 preferably has a supporting structure on which the devices of the functional units 7, 8, 9 are arranged. The supporting structure can hereby be preferably formed by a frame 6 or the housing 15 itself can also be designed as a self-supporting housing 15. The supporting structure 6, 15 preferably consists of both frame sections as well as housing sections.

Like the housing 15, the frame 6 can hereby also consist of metal, plastic or also fiber composites. Preferably, the frame and the housing 15 are bolted together, although any other known type of connection is also possible.

In order to connect the supporting structure 6, 15 to the individual devices of the functional units 7, 8, 9, the energy generating assembly 1 preferentially comprises further elements: The frame 6 can thus be reinforced by a first frame plate 10, a second frame plate 11 and/or a third frame plate 12. A first fixing plate 23, a second fixing plate 13 and a third fixing plate 14 can furthermore be provided, each connected preferably by means of fixing tabs 22 to the first frame plate 10, the second frame plate 11 and/or the third frame plate 12 respectively in order to keep the fixing plates in a defined position. Further preferably, the fixing tabs 22 are made from a flexible material so that thermal expansion of the overall structure can be equalized. The fixing tabs 22 can furthermore have a vibration-damping function. All the devices of the energy generating assembly 1 are then preferably substantially attached to the fixing plates 13, 14, 23 and/or the frame plates 10, 11, 12.

Figure 4:
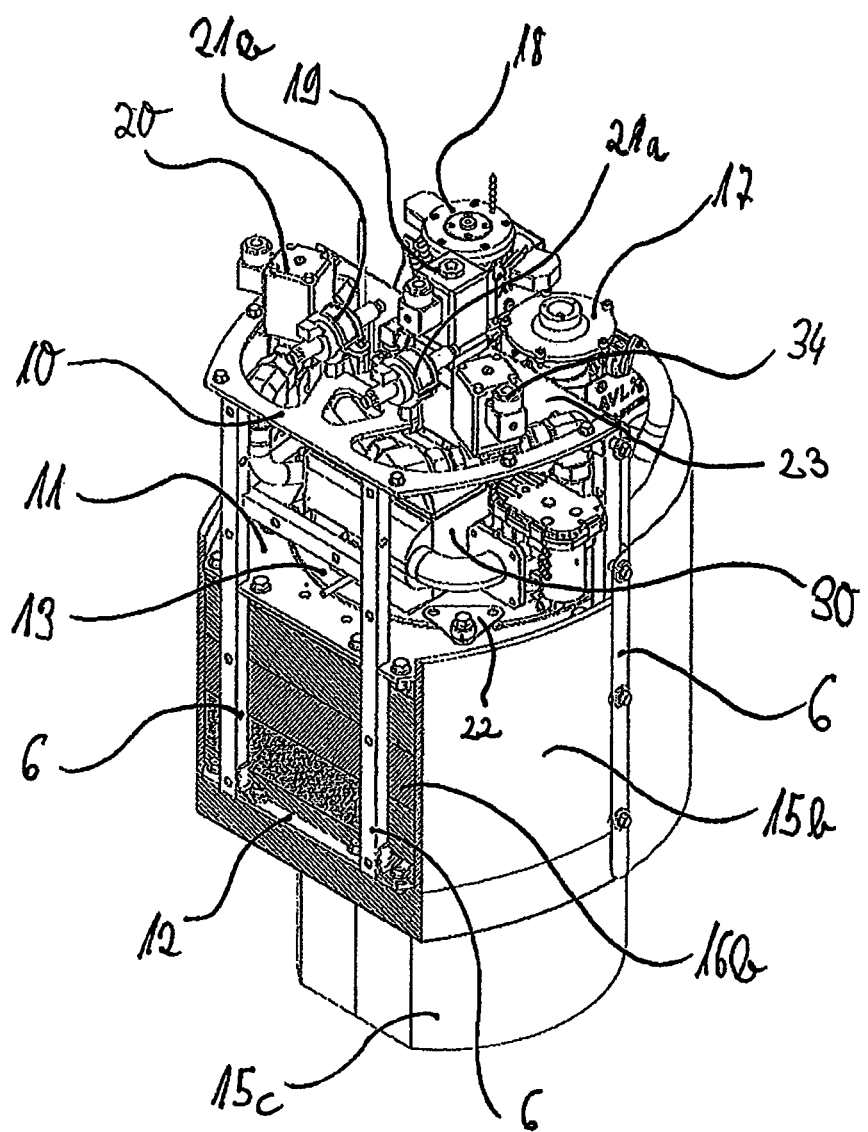
FIG. 4 shows a further partly schematic perspective plan view of an embodiment of the inventive energy generating assembly with a partly removed housing and partly removed and/or cross-sectionally depicted insulation.

FIG. 4 shows the embodiment according to FIG. 3 in a partly schematic perspective view, whereby the energy generating assembly 1 is turned 180° about longitudinal axis L compared to FIG. 2.

The further view shows the air blower 17 and the recirculation fan 18 which are preferably likewise arranged external of the housing 15 and/or the insulation 16. Furthermore, the first frame plate 10, to which some of the devices of the first functional unit 7 are preferably attached, is now visible. In this embodiment, the frame 6 preferably comprises additional frame elements 6 forming a plane on the outside of the housing 15 so that the energy generating assembly 1 can for example be mounted to a vehicle. Damping means to cushion vehicle vibrations on the energy generating assembly 1 can preferably be arranged on these frame sections for mounting purposes. Further visible are the heat exchanger 30 and parts of the fixing plate 13.

Figure 5:
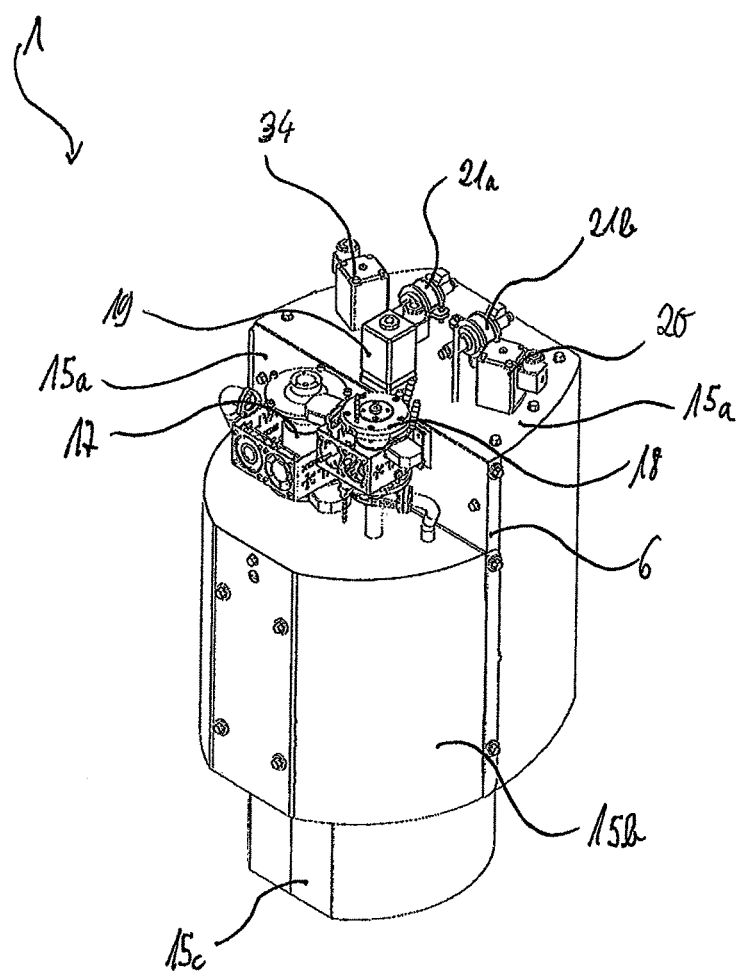
FIG. 5 shows a further partly schematic perspective exterior view of an embodiment of the inventive energy generating assembly with a closed housing.

FIG. 5 shows the energy generating assembly 1 with the housing 15 fully closed, wherein all the housing sections 15a, 15b, 15c are affixed to the energy generating assembly 1. The view is again partly schematic and perspective and the energy generating assembly 1 is again oriented as in FIG. 3. The housing sections 15a, 15b, 15c are thereby preferably bolted, particularly to frame 6.

LIST OF REFERENCE NUMERALS

1 energy generating assembly
2 fuel cell 3 air connection
4 hydrocarbon connection
5 electrical connection
6 supporting structure
7 first functional unit
8 second functional unit
9 third functional unit
10 first frame plate
11 second frame plate
12 third frame plate
13 second fixing plate
14 third fixing plate
14a upper plate
14b lower plate
15 housing
15a, 15b, 15c housing sections
16 insulation
16a, 16b, 16c insulation regions
17 air blower
18 recirculation fan
19 starter burner valve
20 recirculation valve
21a, 21b hydrocarbon pump
22 fixing tab
23 first fixing plate
24 starter burner
25 vaporizer
26 exhaust gas chamber
27 afterburner
28 reformer
29 starter burner flame tube
30 heat exchanger
31 exhaust gas connection
32 combustion chamber
33 cathode air valve
34 reformer air valve
35 afterburner anode gas valve
36 distributor plate
37 reformer catalyst
38 afterburner catalyst

The invention claimed is:

1. An energy generating assembly comprising: a fuel cell and connections for the introducing of air and the hydrocarbons and for the discharging of electrical energy, characterized in that the energy generating assembly comprises three functional units which are substantially separated spatially, wherein a first functional unit is designed to supply the media and substantially comprises devices for supplying fuel and air, wherein a second functional unit is designed for the reforming and substantially comprises devices for converting the hydrocarbons into process gas, and wherein a third functional unit is designed for generating the electrical energy and substantially comprises the fuel cell, and that the third functional unit is supplied the process gas generated in the second functional unit, wherein substantially all of the devices of the energy generating assembly are arranged on a common supporting structure, and wherein the second functional unit for the reforming is arranged between the first functional unit for supplying media and the third functional unit for generating electrical energy.

2. The energy generating assembly according to claim 1, wherein the three functional units are arranged substantially successively, particularly in relation to the flow direction of intake air through the three functional units and/or substantially along a common longitudinal axis.

3. The energy generating assembly according to claim 1, wherein the process temperatures of the devices of the energy generating assembly substantially increase from the first functional unit to the second functional unit over the third functional unit.

4. The energy generating assembly according to claim 1, wherein the supporting structure has a first frame plate on the far side from the second functional unit in the region of the first functional unit, a second frame plate between the first functional unit and the second functional unit and/or a third frame plate between the second functional unit and third functional unit which are in particular made of metal and connected by the supporting structure.

5. The energy generating assembly according to claim 1, wherein a first fixing plate is arranged on the far side of the first functional unit from the second functional unit, a second fixing plate is arranged between the first functional unit and the second functional unit, particularly for fixing the devices of the first functional unit and/or second functional unit, and/or a third fixing plate is additionally arranged between the second functional unit and the third functional unit.

6. The energy generating assembly according to claim 5, wherein the third fixing plate is designed as an adapter plate consisting of an upper plate and a lower plate and connecting the devices of the second functional unit to the fuel cell thermally and/or in fluid communicating manner.

7. The energy generating assembly according to claim 5, wherein the first fixing plate, the second fixing plate and/or the third fixing plate are connected to the supporting structure by at least one flexible fixing tab.

8. The energy generating assembly according to claim 6, wherein the fuel cell and/or at least a part of the adapter plate, particularly the lower plate, can be dismantled so that wearing parts of the second functional unit, particularly a reformer catalyst, are easy to replace.

9. The energy generating assembly according to claim 1, comprising an insulation by means of which the energy generating assembly is substantially adiabatic and which in particular has three insulation regions corresponding to the functional units.

10. The energy generating assembly according to claim 1, comprising a housing in particular consisting of housing sections, each of which substantially covers one of the three functional units and which are individually removable.

11. The energy generating assembly according to claim 9, wherein at least one device for supplying media such as a blower or a compressor, a valve and/or a hydrocarbon pump is arranged external of the housing and/or the insulation.

12. The energy generating assembly according to claim 10, wherein the housing forms at least part of the supporting structure.

13. The energy generating assembly according to claim 1, wherein the supporting structure is substantially formed by a frame, particularly made of metal.

14. A vehicle comprising an energy generating assembly according to claim 1.

* * * * *